United States Patent [19]

Hadley

[11] 3,838,608

[45] Oct. 1, 1974

[54] REMOTE CONTROL REARVIEW MIRROR CONSTRUCTION

[75] Inventor: Richard M. Hadley, Farmington Twp., Oakland County, Mich.

[73] Assignee: Harman International Industries, Inc., Grandville, Mich.

[22] Filed: June 25, 1973

[21] Appl. No.: 373,385

[52] U.S. Cl. .............................. 74/501 M, 74/501 R
[51] Int. Cl. ............................................. F16c 1/12
[58] Field of Search ....... 74/501 M, 501 R; 350/282

[56] References Cited
UNITED STATES PATENTS

| | | | |
|---|---|---|---|
| 3,444,754 | 5/1969 | Liedel | 74/501 M |
| 3,719,105 | 3/1973 | Horwitt | 74/501 M |

Primary Examiner—Samuel Scott
Assistant Examiner—F. D. Shoemaker
Attorney, Agent, or Firm—Miller, Morriss, Pappas & McLeod

[57] ABSTRACT

A right angle actuator fabricated from resin material which provides an integral cup shaped operating buttress for the universal movement of the actuator knob and having guide slots for wires or cables for control access to connector slots in the ball shaped actuator knob element and the actuator body. The actuator body includes an integral tail piece in the form of a guide and a concentric half round shoulder against which a spring over the tail piece seats and an elongate substantially T-shaped compression bar or slider on said tail piece having a journal surface engaging the shoulder portion of the body and a concentric cylindrical recess in reciprocal guide relation over the tail piece of the body and bearing against the spring whereby compression forces are applied to the sheath portion of plural Bowden wire elements.

4 Claims, 3 Drawing Figures

3,838,608

REMOTE CONTROL REARVIEW MIRROR CONSTRUCTION

The present invention is directed to a resin actuator structure for remote control rearview mirrors in which a right angle actuator is improved to include reinforced guide means for applying compressive spring force to the sheath elements of Bowden wire elements adjacent the actuator and resulting in a tensioning of the core elements (wire or cable) by providing a tendency toward straightening the bends in the Bowden wire sheath elements that are operatively buttressed and connected between the actuator at one end and the actuated mirror structure at the other.

In a general way, the subject matter of the invention is directed to a new and improved right angle actuator preferably made from resin material but more particularly to an actuator body which includes a double journalled compression slide bearing against sheath ends and having smooth cable or wire transition slot journalling to the actuator knob and where insertion of the cables to the slots require no threading and entry is from the side. Tension, in the core wire or cable, positions and draws the ball shaped actuator knob into seating relation in the cupped spherical segment socket of the actuator body.

Early effort at applying compression to cable sheaths at the actuator ends of remote control mirror devices is seen in the U.S. Letters Pat. No. 2,931,245 to Jacobson (FIG. 10); U.S. Pat. No. 3,057,262 to Jacobson (FIG. 1 via block 68); U.S. Pat. No. 3,407,684 to Van Noord; U.S. Pat. No. 3,618,420 to Horwitt et al (FIG. 6); and U.S. Pat. No. 3,650,606 to Van Noord (FIG. 5). In remote control rearview mirrors of the cable type where the universal movement is on a fixed spherical buttress, the use of compression in the sheaths to achieve tension in the cables is desirable. In the present invention it is desired to utilize the compression of the sheaths and consequent tension in the core to draw the actuator knob into spherical seating engagement on the actuator base at right angles to the incoming cable elements. Accordingly, the object is to provide an improved guided compression construction for the frame of a right angle actuator for remote control rearview mirrors.

Another object is to provide such a right angle actuator in resin material and where cable access to the slots is sidewise so that at assembly or disassembly no threading of the cable through orifices is required.

Another object is to efficiently seat the spherical base of an actuator knob in a mating spherical socket or dimple cup provided in the actuator body. The core elements or cables pass through the frame body in connecting slots toward the spherical seat to connect with the actuator knob. Still other objects including combinations of the foregoing objects will be increasingly apparent to those with skill in the art as the description proceeds.

GENERAL DESCRIPTION

In general, the right angle actuator comprises a handle which projects outwardly from an intermediate cylindrical skirt portion above and integral with a male spherically configured lower end; an actuator body with a female spherical segment cupped seat, which seat receives the male spherical portion of the handle, and the body including an elongate portion and a tail piece with a concentric shoulder portion; a compression spring sized to fit over the tail piece and bear on the end portion between concentric shoulder and tail piece; and a slider element having an elongate general T-construction with one end (outboard) pierced by an opening which journals the tail piece, and including an elongate semi-cylindrical concentric mid-portion which is in sliding journal relationship with the concentric shoulder of the actuator body. Thus, the slider element is in double journalled relationship with the extension portions of the body. The tail piece of the actuator body is supported by the opening in the end of the slider and the actuator body find linear cradle support with the shoulder bearing on the semi-cylindrical channel portion of the slider. The spring buffers the two elements and is in compression relation buttressed between the actuator body and the slider. Wings, extending from the slider, rest in sliding relation against an integral platform extension of the actuator body and prevent relative rotation when the elements are assembled. Cable slots are radially provided in smooth continuing registry between the slider, the actuator body and the handle elements and achieve a guided right angle transition in the actuator body as between the direction represented by the axis of the tail piece and the spherical axis through the spherical seat and normal to the projected axis of the tail piece. Two of the elements, the handle and the slider, both have a plurality cylindrical pockets radially disposed and penetrated by the slots. The pockets in the slider receive the ends of the sheath elements of the Bowden wire or cable elements. The pockets in the handle (skirt portion thereof) receive terminal ferrules clinched or otherwise secured to the ends of the core pieces or cables of the Bowden wire or cable elements in equiangular relation. These pockets are also penetrated by the radial slots. The slots in the handle are registrable with corresponding slots clustered around the spherical seat and the slots pass radially inwardly into the actuator body and along the length thereof to registry with the corresponding slots in the slider element.

As will be appreciated, the actuator described herein is located remotely from the mirror housing and mirror and the cables, wires, or core pieces run from the actuator to the remote mirror and are operably connected to the mirror so that movement of the actuator handle causes equivalent movement at the mirror and displaces the mirror on a universal pivot in the same manner that displacement occurs at the actuator. However, it is desirable that no slack occur in the core pieces or cables and the present invention assures a net tension in the core pieces by application of a compression to the sheath elements.

The present construction avoids all threading of cables or wires through orifices and the cable guide slots are easily accessible from the perimeter of the elements of the actuator and when the spring is fully depressed, disassembly is easily accomplished because the ferrules on the terminal ends of the cables or wires pocketed in the handle element are then easily freed from the pockets. The handle, body and slider are preferably cast, molded, or die cast in resin material in avoidance of machining and to provide reduction of weight, general lubricity in running relations between cables and body and good dimensional stability and journalling as between the interrelated elements. The resin selected should be mechanically tough and durable through a wide thermal range and should retain its dimensional stability through atmospheric adjustments. The resins selected are not harmed by the environment and can be decoratively trimmed or finished with or without escutcheon hardware to match or heighten interior automotive decor. The preferred resins are "Delrin" an acetal resin material or "Nylon," a long chain synthetic polyamide with recurring amide groups as an integral part of the main polymer chain, and both products under the indicated trademarks of E. I. duPont deNemours & Company or resin materials having similar properties.

In operation, the right angle actuator as herein described has proved to provide a particularly smooth operation, the assembly is considerably simplified, the journalling is improved and stable, and the distribution of compressive forces to the sheath elements in right angle actuation has been improved.

IN THE DRAWINGS

SPECIFIC DESCRIPTION

Figure 1:
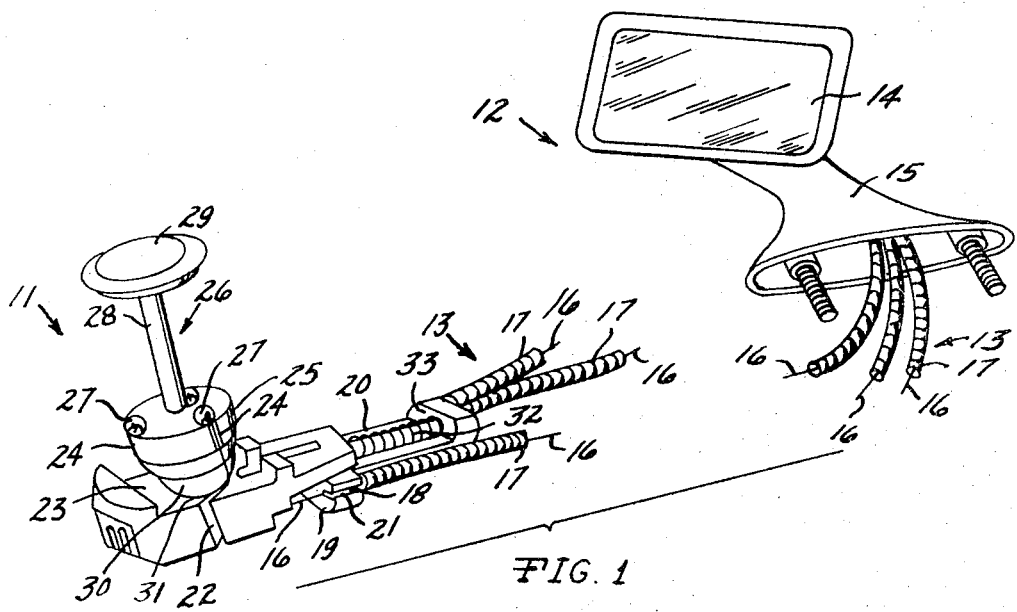
FIG. 1 is a partially exploded perspective view of an actuator assembly and rearview mirror assembly remotely connected to each other by Bowden wire assemblies.

Referring to the drawing and with first particularity to the FIG. 1 thereof, the actuator 11 of the present invention is shown remote from but connected to the mirror structure 12 by means of the Bowden wire or cable assemblies 13. The mirror glass 14 in the mirror housing 15 is universally movable on controlled mechanism (not shown) in the housing 15 well known in the art and to which the Bowden cables or wires 16 are operably connected. The mirror housing 15 is secured externally of a vehicle (not shown) as on the door or fender thereof and Bowden assemblies 13 thus penetrate the body and run to the actuator 11. The Bowden assemblies 13 extend to the actuator 11 where the sheath elements 17 surrounding the core wire or cable 16 is secured in thrust buttress relation in the sockets or pockets 18 provided in the T-head 19 of the slider element 20. Through slots 21 radially into each of the pockets 18 the core wire or cables 16 are passed, as shown, and travel guidably through the transition slots 22 in the actuator body 23 and thence through the radial slots 24 in the skirt portion 25 of the handle element 26 and into the ferrule pockets 27. Hence, the cable ends are securely seated in the pockets 27. The handle element 26 comprises the extension rod 28 and the decorative integral end knob 29. The rod 28 is integral with the cylindrical skirt portion 25 and the lower end of the skirt 25 comprises a spherically configured male portion 30. The spherical male portion 30 seats in a female spherical segment cup-like depression 31 in the actuator body 23. The plurality of slots 22 are clustered radially around the depression 31 and their innermost excursion is in substantial projected register with the slots 24 and ferrule pockets 27 when the handle is in the centered position as shown.

The spring 32 is of the compression type and normally urges separation between the actuator body 23 and the slider element 20. The spring 32 thus bears against the end wall 33 of the slider and a shoulder in the actuator body 23. This applies a thrust to the ends of the sheath elements 17 buttressed in the pockets 18 and tensions the core elements 16 urging the handle 26 into firm spherical seating engagement against the actuator body 23.

Figure 2:
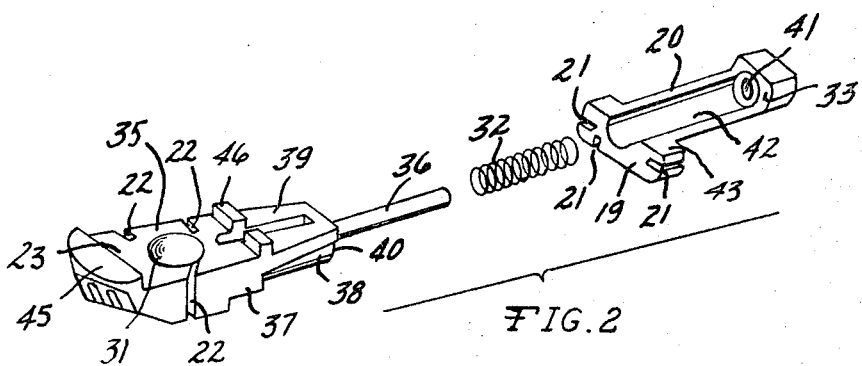
FIG. 2 is an exploded perspective view of the body portion of the actuator element seen in FIG. 1.

In the FIG. 2 the simple assembly relationship of the actuator body 23 and slider 20 is best understood. The actuator body 23 is generally elongate and at one end of the upper surface 35 thereof is the female spherical segment seat or depression 31. The clustered through slots 22 are seen to penetrate the body 23 to the radial registry previously mentioned in respect to the handle 26. These slots 22 are generally arcuate and achieve a right angle transition so as to smoothly and guidably conduct the core piece wire or cables from the entry direction parallel to the tail piece 36 to a direction normal thereto breaking through walls of the body 23. Actually, the slots 22 travel through the body 23 to and through the pedestal block 37. As seen in FIG. 1, the cable elements 16 jump the gap between body 23 and slider 20 and are in projected register with the slots 21. The cables then enter the buttressed sheaths 16 in the pockets 18 in the T-head or wings 19 of the slider 20.

The tail piece 36 is an extension in the form of a rod integral with and extending from the actuator body or frame 23. At connection with the body or frame 23 is a concentric semi-cylindrical surface 38 beneath the strengthening platform 39 and a shoulder 40 is formed by the differential in sizes as between the tail piece 36 and the concentric semi-cylindrical portion 38. The shoulder 40 is thus a thrust buttress for the spring 32.

The other end of the spring 32 guidably bears against the end wall 33 around the opening 41 which provides a linear journal for the tail piece 36. The intermediate portion 42 of the slider 20 is in the form of a semi-cylindrical channel running the length of the slider and concentric about the axis formed by the opening 41. As can be seen, the slider 20 is thus journalled linearly by the bearing formed by opening 41 on the tail piece 36 and by the stabilizing interrelation between the male cylindrical surface 38 journalled or cradled by the female mating surface 42. The pad portions 43 of the wings 19 of the slider 20 prevent rotation about the axis created by the tail piece 36 since they engage the underside of the platform portion 39 of the actuator body 23.

The raised boss portions 45 and 46 of the actuator body 23 provide panel and escutcheon mounting means as through a body panel or door panel of an automobile.

Figure 3:
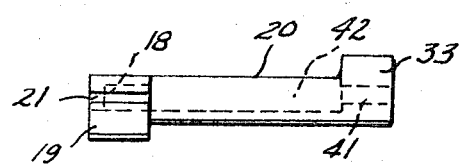
FIG. 3 is a side elevation view of the slider element having two concentric linear journal surfaces and guidably receiving the tail piece of the actuator body.

The FIG. 3 best represents the profile configuration of the slider 20 and best illustrates the plural pocket positions 18. The preferred material for the actuator body 23, the handle 26 and the slider 20 is "Delrin," an acetal resin sold under the trademark of E. I. duPont deNemours & Company, but other sources and other resins having similar molding, physical, mechanical, and dimensional properties are acceptable, such as "Nylon" a long chain synthetic polyamide which has recurring amide groups as an integral part of the main polymer chain, the trademark belonging to E. I. duPont deNemours & Company.

Operationally, the structure just described is improved over prior thruster type structures in the provision for double journalling, the full side slot access in assembly and the relative economy in use of resins having inherent lubricity and dimensional stability through broad operation, atmospheric and thermal ranges.

Having thus described my invention and in particular one preferred embodiment thereof, others skilled in the art will perceive improvements, modifications and changes therein and such improvements, modifications and changes within the skill of the art are intended to be included herein limited only by the scope of my hereinafter appended claims.

I claim:

1. A right angle actuator for remote control of rearview mirrors comprising:

an actuator handle, the lowermost portion thereof forming a spherical male surface and a skirted cylindrical portion integral above said spherical surface and being radially slotted to longitudinal pockets in radial relation around the axis of said handle;

an actuator body having a female spherical segment seat matingly receiving said spherical male portion of said actuator handle and provided in one side of said body and defining plural slots through said body in gradual transition relation from register with said slots in said handle to a right angle relation along the length of said body and said body having an integral tail piece extending outward therefrom and an integral concentric guide shoulder adjacent the inboard end of said tail piece;

a spring on said tail piece engagable with the buttress formed between said tail piece and said guide shoulder; and a slider element on said tail piece having a channel in linear semi-cylindrical journal relation with said guide shoulder on said actuator body and having a coaxial opening in the end wall thereof through which said tail piece extends in journalled relation with said end wall engaged against said spring and radially disposed pockets provided in said slider sized to receive sheath elements and radial slots extending into said pockets through which said cables registrably pass to said transition slots in said actuator body.

2. A right angle actuator for remote control cable operated rearview mirrors comprising:

an elongate resin actuator body element having a tail piece extending from one end of said body and including a concentric semi-circular shoulder integral with said body and said tail piece and said body defining slot openings therethrough into which cable elements pass and are linearly movable and said openings directing said cables at right angles to their entry to said body;

a spherical seat provided in one side of said body element adjacent the end of said body element remote from said tail piece and said slot openings grouped around said spherical seat in equi-angular interval relationship;

a compression spring axially over said tail piece and at one end engaging a thrust buttress of said actuator body formed by said semi-circular shoulder;

a slider having a plurality of radially disposed cable slots longitudinally therethrough and each having a sheath pocket and said slider having a guide journal opening in the end wall thereof through which said tail piece is extendable and said end wall in thrust relation with said compression spring, said slider having an integral elongate semi-circular cross-section in linear journal relation with said semi-circular shoulder of said actuator body; and an actuator handle having a plurality of radially disposed pocket portions clustered on a spherical portion and said pockets accessible through smaller radially oriented slots through which said cables are passed and said slots in registering angular relation to said slots in said body terminating around said spherical seat.

3. In the combination of claim 2 wherein said actuator handle, said body, and said slider are made from injection molded resin material in substantial avoidance of machining.

4. In the combination of claim 3 wherein the resin material is an acetal resin.

* * * * *